United States Patent
Albrecht et al.

(10) Patent No.: US 11,641,322 B2
(45) Date of Patent: May 2, 2023

(54) SYSTEM, COMPUTER PROGRAM, COMPUTER-READABLE MEDIUM AND METHOD FOR PROVIDING A REDUNDANT RELAY, PARTICULARLY A ROUTING FUNCTION

(71) Applicant: Siemens Aktiengesellschaft, Munich (DE)

(72) Inventors: Harald Albrecht, Nuremberg (DE); Hendrik Gerlach, Erlangen (DE); Stephan Höme, Schwabach (DE); Martin Mehn, Herzogenaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/285,990

(22) PCT Filed: Sep. 26, 2019

(86) PCT No.: PCT/EP2019/075990
§ 371 (c)(1),
(2) Date: Apr. 16, 2021

(87) PCT Pub. No.: WO2020/078684
PCT Pub. Date: Apr. 23, 2020

(65) Prior Publication Data
US 2021/0377165 A1    Dec. 2, 2021

(30) Foreign Application Priority Data
Oct. 17, 2018    (EP) .................................... 18200937

(51) Int. Cl.
*H04L 12/713*    (2013.01)
*H04L 29/12*    (2006.01)
(Continued)

(52) U.S. Cl.
CPC ........ *H04L 45/586* (2013.01); *H04L 61/5014* (2022.05); *H04L 69/40* (2013.01); *H04L 2101/659* (2022.05)

(58) Field of Classification Search
CPC ... H04L 45/586; H04L 61/2015; H04L 45/16; H04W 40/005
See application file for complete search history.

(56) References Cited

U.S. PATENT DOCUMENTS

| 1,091,162 | A | 3/1914 | Radford |
| 10,069,789 | B2 | 9/2018 | Albrecht et al. |

(Continued)

FOREIGN PATENT DOCUMENTS

| CN | 104158694 | 11/2014 |
| EP | 2940972 | 11/2015 |

(Continued)

OTHER PUBLICATIONS

Irugalskimsiodelskiiscbvolzayourtchenkociscomrichardsonsswsjianghuawet[Emonnominumtwintersunh-Iolt:"DynamicHostConfigurationProtocolforIPv6(DHCPv6)bis;draft-ietf-lhc-rfc3315bis-13.txt",DynamicHostConfigurationProtocolforIPv6(DHCPv6)Bis; RAFT-IETF-DHC-RFC3315BIS-13. (Year: 2018).*

(Continued)

*Primary Examiner* — Romani Ohri
(74) *Attorney, Agent, or Firm* — Cozen O'Connor (57) ABSTRACT

A system, computer program, computer-readable medium and method for providing a redundant relay, particularly routing function in a network, wherein a superordinate subnetwork is connected to a subordinate subnetwork via redundant relays, particularly routers, a maximum of one of the redundant relays is operated in an active mode at any one time, while the remaining relay(s) are in standby mode, each redundant relay forms a relay redundancy module for con- (Continued)

trolling the relay mode and a DHCPv6 client for processing a prefix delegation, particularly in accordance with RFC 3633, and the redundant relays each include a relay control module, to which the relay redundancy module of the particular relay signals the current relay mode, and the relay control module of the active relay synchronizes a virtual DUID of its DHCPv6 client and/or a prefix delegated to the active relay to the (or each) relay in standby mode.

24 Claims, 2 Drawing Sheets

(51) Int. Cl.
*H04L 45/586* (2022.01)
*H04L 69/40* (2022.01)
*H04L 61/5014* (2022.01)
*H04L 101/659* (2022.01)

(56) References Cited

U.S. PATENT DOCUMENTS

| | | | |
|---|---|---|---|
| 10,298,724 B2 | 5/2019 | Albrecht et al. | |
| 2008/0043614 A1* | 2/2008 | Soliman | H04W 8/065 370/208 |
| 2015/0117179 A1* | 4/2015 | Sato | H04L 45/00 370/219 |
| 2015/0312213 A1 | 10/2015 | Albrecht | |
| 2019/0097966 A1* | 3/2019 | Hu | H04L 61/5061 |

FOREIGN PATENT DOCUMENTS

| | | |
|---|---|---|
| EP | 2955904 | 12/2015 |
| EP | 3062490 | 8/2016 |
| EP | 3076636 | 10/2016 |
| EP | 3091714 | 11/2016 |
| EP | 3076636 B1 | 1/2018 |
| WO | 2018006684 | 1/2018 |

OTHER PUBLICATIONS

RFC 5798, IETF, Obsoletes 3768, ISSN: 2070-1721,Ericsson Mar. 2010 by Nadas et al. (Year: 2010).*

Mrugalski et al, "Dynamic Host Configuration Protocol for IPv6 (DHCPv6) bis; draft-ietf-dhc-rfc3315bis-13.txt", No. 13, pp. 1-147, XP015125870; [gefunden am Apr. 7, 2018]; pp. 20, 30-34; 2018 (Year: 2018).*

Network Working Group, Request for Comments: 3633, IPv6 Prefix Options for Dynamic Host Configuration Protocol (DHCP) version 6, RFC 3633 (https://tools.ietf.org/ html/rfc3633, pp. 19; 2003.

Network Working Group, Request for Comments: 3315, IETF-Standard-Entwurf RFC 3315 (https://tools ietf. org/html/rfc3315), pp. 101; 2003.

PCT International Search Report dated Nov. 8, 2019 based on PCT/EP2019/075990 filed Sep. 26, 2019.

* cited by examiner

SYSTEM, COMPUTER PROGRAM, COMPUTER-READABLE MEDIUM AND METHOD FOR PROVIDING A REDUNDANT RELAY, PARTICULARLY A ROUTING FUNCTION

CROSS-REFERENCE TO RELATED APPLICATIONS

This is a U.S. national stage of application No. PCT/EP2019/075990 filed 26 Sep. 2019. Priority is claimed on European Application No. 18200937.3 filed 17 Oct. 2018, the content of which is incorporated herein by reference in its entirety.

BACKGROUND OF THE INVENTION

1. Field of the Invention

The invention relates to a method for providing redundant relay, in particular routing, functions in a, in particular industrial, network in which a higher-level subnetwork is connected to a lower-level subnetwork via two or more redundant relays, in particular routers, in which a maximum of one of the redundant relays is ever operated in an active mode, while the remaining relay(s) are in the standby mode, where each redundant relay includes a relay redundancy module for controlling the relay mode, and if the currently active relay fails then the or precisely one of the remaining redundant relay(s) of the relay redundancy module thereof is activated.

Furthermore, the invention relates to a computer program, a computer-readable medium and a system for providing redundant relay, in particular routing, functions, comprising two or more redundant relays, in particular routers, that connect or can connect a higher-level subnetwork to a lower-level subnetwork, where each redundant relay has a relay redundancy module, and where the system is configured such that a maximum of one of the redundant relays is ever operated in an active mode, while the remaining relay(s) are in the standby mode, and if the currently active relay fails then the or precisely one of the remaining redundant relay(s) of the relay redundancy module thereof is activated.

2. Description of the Related Art

In the industrial sector, in particular in hierarchic automation networks, IPv6 routers and NAT64 routers are used. Routers allow "network isolations" to be achieved relatively easily, which cause, for example, a communication load as a result of broadcast messages to remain constrained. IP routing is essential to allow end-to-end connectivity at IP level despite the network isolation.

In order to prevent the IP routing that accompanies network isolations from requiring extensive IT know-how from the user, it is possible for autoconfiguring routers to be used.

In particular for an industrial use, importance lies not only in the most extensive automatic configuration possible but also in the highest possible availability, particularly for infrastructure components, such as relays, in particular IPv6 and NAT64 routers. High availability can be attained in principle by providing substitute relays, or substitute routers, that take over, or "jump in", for a failed device/a failed function.

Both in the case of IPv4 and in the case of IPv6, the actual routing process is stateless. For a stateless case, it is a comparatively simple matter to switch over from a failed router to a substitute router. This is in particular without the substitute router first needing to be synchronized to the state of the failed router.

The applicant has developed a series of autoconfiguration mechanisms in particular for the context of industrial automation applications. By way of illustration, reference will be made here to EP 2 940 972 A1, EP 2 955 904 B1, EP 3 076 636 B1, EP 3 062 490 B1 and EP 3 091 714 B1.

A substantially stateful element can appear as a result of the autoconfiguration: the automatic prefix configuration, that is to say the automatic configuration of the subnetwork band.

The standardized, functional "foundation" of autoconfiguring IPv6 and NAT64 routers can be formed by so-called "prefix delegation" (see in particular "Request For Comments" (RFC) 3633).

Technically, prefix delegation is based on DHCPv6, in particular in accordance with RFC 3315, and preferably on the "stateful" variant of DHCPv6. When a prefix delegation occurs, a state that is particularly required for an autoconfiguration is introduced into the actually stateless relays, in particular IPv6 or NAT64 routers.

In the industrial sector, there is a need for high availability also when using automatically configuring relays, in particular routers.

Various redundancy mechanisms are already known from the prior art.

For IP routers, there is the "Common Address Redundancy Protocol" (CARP) and the "Virtual Router Redundancy Protocol" (VRRP) (see RFC 5798, inter alia). Accordingly, a group of routers is provided with a common virtual IP address and often also a common virtual MAC address. The IP and MAC addresses are activated only on the respectively active router. If the active router fails, then another router is activated and reclaims the virtual IP and MAC addresses for itself. With respect to IPv6, this approach has the advantage that it is not first necessary for the "Neighbour Unreachability Detection" (see section 7.3 in RFC 4861) to respond so that an individual IPv6 node switches over from the failed IPv6 router to a substitute router. Instead, the switchover occurs unseen by the IPv6 nodes, because both the IPv6 address of the router and the MAC address thereof remain unchanged.

DHCPv6 also knows a redundancy mechanism (see, in particular, RFCs 6853 "DHCPv6 Redundancy Deployment Considerations" and 7031 "DHCPv6 Failover Requirements"), but only one for the DHCPv6 servers, because the focus is on server redundancy. The applicant is of the opinion that this is probably owed in particular to the original field of use being the office or home sector, because IP addresses are supposed to be allocated automatically in these sectors, where it is irrelevant which ones they are. If a terminal fails, then it is not necessary for a substitute device waiting on standby to assume the tasks of the failed device as quickly as possible. This is in particular because there are usually no other devices dependent on a home PC, for example.

By contrast, a series of other devices are generally dependent on a router/NAT device, which means that a failure has a greater effect here.

Finally, the applicant knows that IP and NAT routers are often configured statically by IT specialists in the business sector. Here, the user, in particular in the form of an IT expert, is responsible for a substitute device again being configured for redundancy operation in the event of failure of an active router. This is associated with not inconsiderable use of personnel and time.

WO 2018/006684 A1 discloses a message processing method and device and also a router. The method involves the use of a main router and a backup router, which are in a main and backup relationship. A solution is provided for the problem that in a dual machine standby network there is uncertainty with regard to an address obtained by a user.

CN 104158694 further discloses a hot standby method and an associated apparatus for a DHCPv6 server. A host DHCPv6 server receives a service request that comprises a VDUID transmitted by a DHCPv6 client, ascertains whether the VDUID is stored in a stored DUID-linked list and, if this is the case, provides a business service for the DHCPv6 client. The host DHCPv6 server informs a standby DHCPv6 server in the event of error. The standby DHCPv6 server switches over the state of the VDUID from an unavailable state to an available state and provides a business service for the DHCPv6 client.

In the industrial sector, there is a need for high availability also in automatically configuring relays, in particular routers.

SUMMARY OF THE INVENTION

In view of the foregoing, it is therefore an object of the present invention to provide a systema and method that allows increased fail-safety also for relays, or IPv6 or NAT64 routers, with stateful autoconfiguration.

This and other objects and advantages are achieved in accordance with the invention by a method in which the redundant relays, in particular routers, each comprise a DHCPv6 client for performing a prefix delegation, in particular in accordance with RFC 3633, where only the DHCPv6 client of the currently active relay ever performs the prefix delegation, in particular in accordance with RFC 3633, and the redundant relays each have a relay control module to which the relay redundancy module of the respective relay signals the current relay mode, and the relay control module of the respectively active relay synchronizes a virtual DUID of its DHCPv6 client and/or a prefix delegated to the active relay to the or each relay, in particular the relay control modules thereof, that is in the standby mode, and if the currently active relay fails then the relay control module of the relay activated in reaction to the failure starts the DHCPv6 client thereof, and the DHCPv6 client resorts to the DUID obtained via the synchronization and/or to the prefix obtained via the synchronization.

It is also an object of the invention to provide a system in which the redundant relays, in particular routers, each comprise a DHCPv6 client for carrying out a prefix delegation, in particular in accordance with RFC 3633, and a relay control module, where the system is configured such that only the DHCPv6 client of the currently active relay ever carries out the prefix delegation, in particular in accordance with RFC 3633, and where the relay redundancy module of the respective relay signals the current relay mode to the relay control module of the respective relay, and where the relay control module of the respectively active relay synchronizes a virtual DUID of its DHCPv6 client and/or a prefix delegated to the active relay to the or each relay, in particular the relay control modules thereof, that is in the standby mode, and where if the currently active relay fails then the relay control module of the relay activated in reaction to the failure starts the DHCPv6 client thereof, and where the DHCPv6 client resorts to the DUID obtained via the synchronization and/or to the prefix obtained via the synchronization. The system in accordance with the invention is configured to perform the method in accordance with the invention.

In other words, the fundamental idea of the present invention is to provide a novel synchronization mechanism for prefix delegation for DHCPv6 clients. This makes it possible to also use autoconfiguration mechanisms, which are based on, or use, prefix delegation, on redundant relays, in particular routers, which dispenses with the need for rigid or static configuration by an IT expert who statically sets the IPv6 prefixes to be transmitted when setting up the relays, or routers, and accordingly needs to set a substitute device again manually as appropriate in the event of a failure. The previous, static configuration did not allow automatic prefix delegation by DHCPv6 to be used in the context of a redundant relay, in particular router, this becoming possible as a result of the present invention.

The invention specifically provides a lower-level redundancy mechanism that is based in particular on known mechanisms for IP routers, in particular CARP and VRRP, but is independent thereof and in particular is not an extension of these known mechanisms. In accordance with the invention, an independent functional redundancy layer above the IP/MAC redundancy layer is instead proposed. In particular, the autoconfiguration control plane is extended by a redundancy mechanism.

In the case of MAC redundancy, the same packet is transmitted on multiple paths in the network at the same time (i.e., "duplication") and then the duplicates are detected by the receiver within the MAC layer and rejected, so that higher layers, such as the IP layer, no longer see duplicates. Such MAC redundancy is not required with the approach in accordance with the invention. Similarly, no IP redundancy whatever is required, in the sense that IP packets are sent in duplicate and via different paths, where the receiving IP stacks would then need to remove duplicates again before the IP data are passed to the applications. By contrast, the invention uses IP redundancy in the sense that no duplication will occur, but rather a defective network area (e.g., a defective relay, in particular a defective router or the cabling thereof) is bypassed, i.e., entirely in the original spirit of the IP architecture. Bypassing is particularly effected by reconfiguring routes, where known mechanisms can be used, preferably router advertisements, routing protocols such as OSPF, or RIP.

The invention provides a mechanism that can be or is used (based on available standard (software) components) to technically achieve the actual redundancy function with reference to prefix delegation.

The approach in accordance with the invention allows redundant relays, in particular routers, to share not only a virtual MAC address and IP address but also a DHCPv6 client DUID, i.e., a DHCP unique identifier. This client DUID identifies the logical, active relay, in particular the logical, active router, to the higher-level plane that delegates the prefix. The status of a DHCPv6 prefix delegation is synchronized by an active relay, in particular router, to one or more substitute relays, in particular substitute routers. A redundancy switchover in accordance with the present invention involves the state also being transferred to the new relay, in particular the new router, i.e., the substitute relay, or the substitute router, and thus the client DUID also being "moved".

If an active relay, in particular an active router, fails then a substitute relay, in particular substitute router, can take over, the change being unable to be seen (with the exception of any temporary packet loss) by IPv6 nodes connected to the lower-level, downstream network. In particular, the IPv6 and MAC addresses of the autoconfiguring relay, or router, remain constant. At the same time, the identity of the relay, or router, in particular IPv6 router, also remains the same from the point of view of the higher-level, delegating router. In the case of IPv6, the identity of clients is coupled solely to the DUID thereof and not to the MAC address thereof.

This allows even automation users to obtain the added value of the redundancy of their network nodes, without this requiring them to acquire specific IT know-how or to involve IT personnel.

For this purpose, the two (or more) redundant relays, in particular routers, each have, in accordance with the invention, a relay control module that firstly ensures that the currently active relay synchronizes the status of the DHCPv6 prefix delegation to the further relay(s), in particular the relay control modules thereof, that are in the standby mode, so that, in the event of a failure of the active relay, in particular router, the status is available there. The state of the DHCPv6 client of the (respectively) active relay, in particular router, can be stored, for example, in a file in the file system of the active relay, in particular router.

The synchronization of the virtual DUID and/or of the delegated prefix can be effected, for example, by virtue of the relay control module of the respectively active relay announcing the virtual DUID and/or the delegated prefix to the relay control module of the or each relay in the standby mode. The system in accordance with the invention can accordingly advantageously be configured such that the synchronization of the virtual DUID and/or of the delegated prefix is effected by virtue of the relay control module of the respectively active relay announcing the virtual DUID and/or the delegated prefix to the relay control module of the or each relay in the standby mode. The synchronization of the virtual DUID and/or of the digital prefix is preferably effected by protocol. In an embodiment, the system in accordance with the invention can accordingly be configured such that the synchronization of the DUID and/or of the delegated prefix is effected by protocol. By way of example, a "secure remote copy" of the state data in the form of a file in the file system of the active relay, or router, can be made in the file system of the relay(s), or router(s), in the standby mode.

A relay, in particular router, being in the active state particularly means that it undertakes the function of forwarding packets from the higher-level to the lower-level (sub)network in a manner known per se, whereas the relay(s), in particular router(s), do not do this in the passive or standby mode, but rather only stand by and "wait" to take over for the active relay or router in the event of a failure thereof.

A relay or router failure can be attributable to or caused by, for example, a failure of the device hardware and/or a crash of the relay or router software and/or a failure of the power supply and/or a defect in the network cabling.

A relay as defined by the present application is intended to be understood to mean in particular a function of the layer n that forwards data that it has received from one entity to another entity, preferably as defined by International Organization for Standardization/International Electrotechnical Commission (ISO/IEC) standard 7498-1:1994, clause 5.3.1.6.

A relay, in particular a layer-3 relay, can exist in the form of a router.

A router can be intended to be understood to mean in particular any function, or any node (or any device), which forwards packets that are not explicitly addressed to it, preferably as defined by RFC 4861.

A relay, in particular router, can be, for example, a (separate) device, or a (separate) hardware component, that is configured to perform this function. It should also be understood it is possible for a relay to be present as a "software relay", or "soft relay", or for a router to be present as a "software router", or "soft router", for example, in the form of a computer program, or a collection of computer programs, that is stored on a device designed for execution thereof, for example, a PC or another computing device or any other device. A relay, or router, or the relay or router function, for example, can also be integrated in a controller, such as a programmable logic controller (PLC) of an automation system, or in another device, in the form of both hardware and software.

The term relay, or router, as defined by the present application covers all of the aforementioned possibilities, in particular including "soft relays"/"soft routers" and devices that actually perform other functions, or serve another purpose, but also undertake a relay or router function, i.e., in particular also forward data that are not explicitly addressed to them. For example, an automation device, for example, an in particular programmable logic controller, having a relay or router function might also be deemed a relay or router in accordance with the disclosed embodiments of the present invention, or, if it incorporates a separate device that is of appropriate configuration, such a controller comprises a relay or router as defined by the present disclosed embodiments of the invention.

A relay or router normally has at least one upstream interface and at least one downstream interface. However, it may also be that a relay or router has only a single (physical) interface, and the distinction between upstream and downstream is made solely on a software basis. The interface used can be a port of a relay or router.

An upstream interface, i.e., an upstream interface of a relay or router, is in particular an interface that points in the direction of at least one higher-level (sub)network and/or relay, or router. A downstream interface is in particular one that points in the direction of at least one lower-level (sub)network.

In particular, if the redundant relays exist in the form of routers, then they comprise not only the relay redundancy and relay control modules, which can also be referred to as router redundancy and router control modules in the case of a router, but additionally, expediently, in each case a router advertisement module, via which advertisement messages can be announced to the router in the lower-level network. The router advertisement modules are preferably configured for correctly implementing the router advertisement protocol.

The router advertisement modules can each comprise or be formed by a combination of hardware and software or else they can be purely software-implemented or purely hardware-implemented. The router advertisement modules can, for example, each comprise or can be provided by a router advertisement daemon (RAD or radvd), possibly in combination with suitable hardware.

The relay or router control modules can also each be purely software-implemented or else purely hardware-implemented, or comprise a combination of software and hardware, in particular hardware provided specifically for the software.

The relay or router control modules undertake (besides the state synchronization in the case of the active router) the correct orchestration of the DHCPv6 clients and in particular router advertisement modules that are involved.

If the relay control module of a redundant relay is sent a report, in particular by the relay redundancy module of this relay, that the relay was transferred to the active state, then the relay control module activates the DHCPv6 client and (especially if redundant relays in the form of redundant routers are present) in particular the router advertisement module.

The router advertisement module of a router that is, or was, transferred to the active state (in each case) in reaction to the failure of a previously active router preferably keeps the prefix obtained via the synchronization active in the lower-level network, in particular announces this prefix to IPv6 subscribers connected to the lower-level network, in particular in accordance with RFC 4861.

On the other hand, the relay or router control module of the remaining redundant relay(s), or router(s), which is/are currently not active but rather in the standby mode, deactivates the DHCPv6 clients thereof and in particular the router advertisement modules thereof and/or keeps them deactivated for as long as the relay(s), or router(s), are not active.

Preferably, only the respectively active redundant relay, in particular only the respectively active redundant router, carries out prefix delegation, while the DHCPv6 clients of the remaining redundant relays, or routers, are preferably in a standby mode, or deactivated, and do not perform prefix delegation.

The role of the relays, in particular routers, is controlled in accordance with the disclosed embodiments of the invention via a relay, in particular router, redundancy module, which each of the redundant relays, in particular each of the redundant routers, likewise has. The relay redundancy modules can (just like the relay control modules and router advertisement modules) each be purely software-implemented or else purely hardware-implemented, or can comprise a combination of software and hardware, in particular hardware provided specifically for said software.

In a preferred embodiment, the relay, in particular router, redundancy modules are configured to execute the Common Address Redundancy Protocol and/or the Virtual Router Redundancy Protocol, in particular in accordance with RFC 5798, which has proved to be successful.

In a further embodiment, in addition to the relay that is (newly) activated (in each case) in reaction to the failure of a previously active relay resorting to the synchronized state, the (newly) activated relay validates the delegated prefix obtained via the synchronization on a higher-level, in particular the prefix-delegating, router. In a preferred embodiment, the system in accordance with disclosed embodiments of the invention is configured accordingly.

Expediently, each redundant relay, in particular router, stores or is used to store the same virtual IP address and/or the same virtual MAC address, and the virtual IP address and/or virtual MAC address is only ever activated on the redundant relay, in particular router, that is in the active mode. The system in accordance with disclosed embodiments of the invention is preferably configured accordingly.

If, in reaction to the failure of one of the redundant relays, in particular routers, another relay, in particular another router, is transferred to the active state, the the other relay, or other router, additionally preferably reclaims the same virtual IP address and/or the same virtual MAC address for itself as was previously used by the failed relay, in particular router, and is preferably also stored on the newly activated relay, in particular router.

In further particularly preferred embodiment, that instance of the redundant relays, in particular that instance of the redundant routers, that is the very first to be in the active mode generates a unique, dedicated DHCPv6 client DUID for itself. This can happen in particular by virtue of it extending or replacing the DUID with a unique bit pattern, where the unique bit pattern can be provided, for example, by the device MAC address of this relay or router and/or by a current system time.

Conveniently, the client DUID is not formed solely from the (virtual) MAC address in accordance with RFC 3315. This MAC address is usually unique only within the individual upstream or downstream network. Consequently, DUID collisions can occur on a higher-level, delegating router. This all the more when relays or routers are repeatedly installed identically in a similar manner to production machines. For this reason, the active relays or routers, when starting up for the very first time, preferably individualize their client DUIDs, this being possible as a result of the DUID being extended/replaced by a unique bit pattern. In a preferred embodiment, the system in accordance with disclosed embodiments of the invention is configured accordingly.

There can be provision for at least one, preferably all, redundant relay(s) to be a gateway, in particular an application layer gateway (ALG). These normally have one or more IPv6 address(es) and can remove an application protocol via IPv6 to a or the same application protocol, or a non-IP protocol.

It is also possible for relays in the form of routers to be used. There can then be provision for at least one of the redundant relays to be an IPv6 router. Alternatively or additionally, at least one of the redundant relays is an NAT64 router. Naturally, all of the redundant relays can also be present in the form of IPv6 routers or all of the redundant relays can be present in the form of NAT64 routers.

It is also a further object of the invention to provide a computer program comprising program code instruction which, when the program is executed by a processor on at least one computer, cause the at least one computer to perform the method in accordance with the disclosed embodiments of the invention for providing redundant routing functions.

It is yet a further object of the invention to provide a non-transitory computer-readable medium comprising program instructions which, when executed by a processor on at least one computer, cause the at least one computer to perform the steps of the method in accordance with the disclosed embodiments of the invention for providing redundant routing functions.

The computer-readable medium can be a CD-ROM or DVD or a USB or flash memory, for example. It will be noted that a computer-readable medium is not intended to be understood to mean exclusively a physical medium but rather can also be present for example in the form of a data stream and/or a signal that represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the description of embodiments according to the invention that follows with reference to the accompanying drawing, in which.

DETAILED DESCRIPTION OF THE EXEMPLARY EMBODIMENTS

Figure 1:
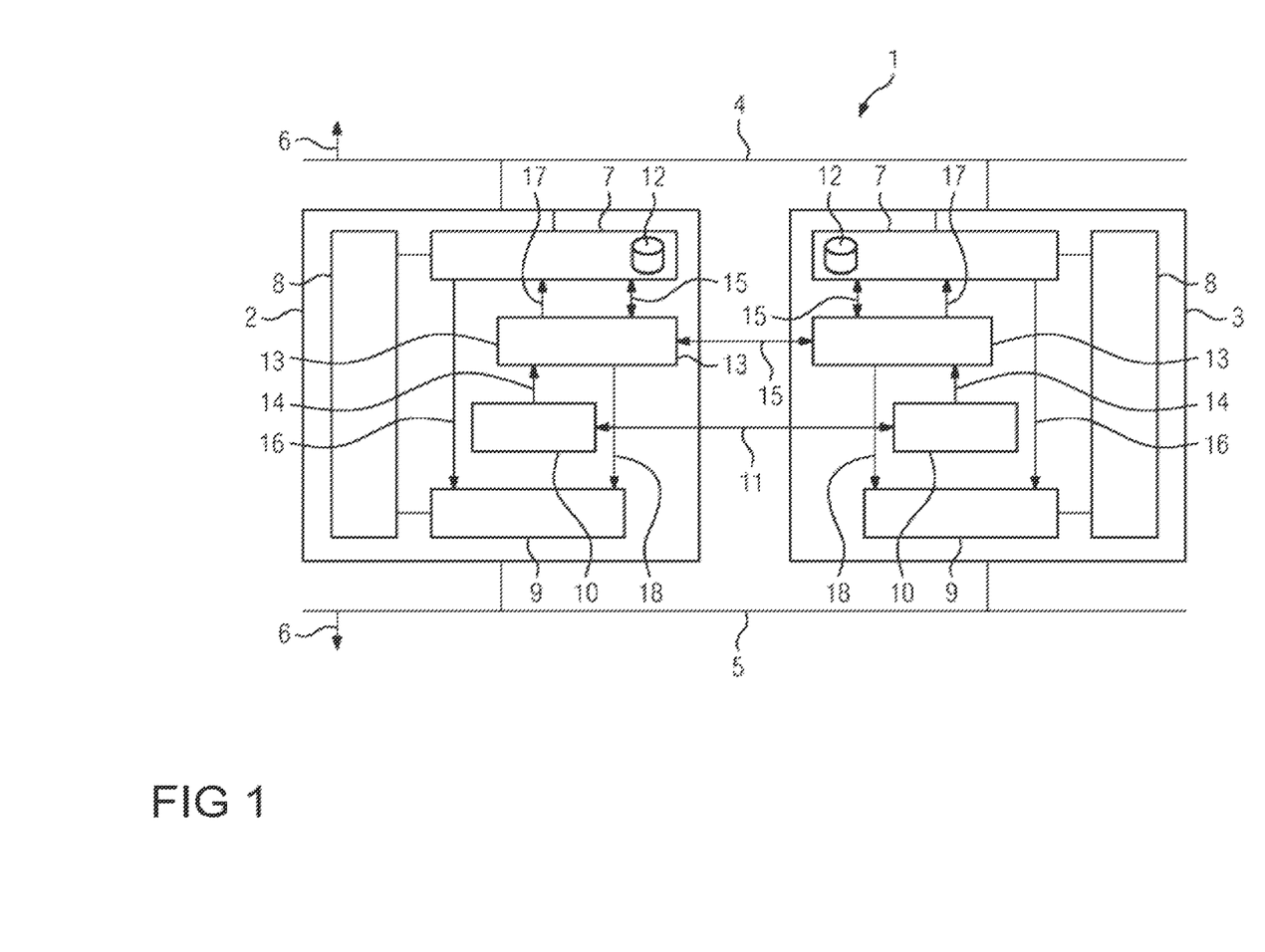
FIG. 1 is a schematic illustration of an exemplary embodiment of a system in accordance with the invention.

Shown in FIG. 1 is a schematic illustration of an exemplary embodiment of a system 1 in accordance with the invention for providing redundant relay, in the present case routing, functions.

The system 1 comprises two redundant relays which, in the case of the exemplary illustrated embodiment, are provided by two redundant routers 2, 3 that connect a higher-level upstream subnetwork 4 to a lower-level downstream subnetwork 5 of an industrial network, which is not depicted further in FIG. 1, of an automation solution. The upstream and downstream subnetworks 4, 5 are depicted only purely schematically in FIG. 1, among other things by an arrow 6 pointing upward and downward, respectively. Each of the two redundant routers 2, 3 has an upstream interface (not shown), which is connected to the upstream subnetwork 4, and a downstream interface (not shown), which is connected to the downstream subnetwork 5.

Each of the two redundant routers 2, 3 additionally comprises a DHCPv6 client 7, an IP stack 8 and a router advertisement module 9, which is configured to correctly implement the advertisement protocol, in a manner known per se. The router advertisement modules 9 in the present case are provided as router advertisement daemons (RADVD), or each comprise a router advertisement daemon. The DHCPv6 client 7 and the IPv6 stack 8 are likewise elements that are sufficiently well known from routers in accordance with the prior art, which means that they are not discussed further.

During operation, only a maximum of one of the two redundant routers 2, 3 is ever in the active mode, while the other is in the standby mode and "waits" to take over for the previously active router in the event of the latter failing, in particular no longer forwarding or being able to forward packets. A router failure can be attributable to, or caused by, for example, a failure of the device hardware and/or a crash of the router software and/or a failure of the power supply and/or a defect in the network cabling. It is subsequently assumed that, in an initial situation, the left-hand router 2 in FIG. 1 is in the active mode and the right-hand router 3 in the figure is in the standby mode, where it should be understood the roles could likewise be reversed.

Only the router 2, 3 that is in the active mode undertakes the routing function and forwards packets from the higher-level subnetwork 4 to the lower-level subnetwork 5 in a manner known per se.

Each of the two redundant routers 3 of the system 1 has, in addition to the modules or components already cited, a router redundancy module 10 that controls the mode of the respective router 2, 3, i.e., the role thereof.

In the present case, the router redundancy modules 10 of the two redundant routers 2, 3 are configured to execute the "Common Address Redundancy Protocol" (CARP). Alternatively or additionally, they can be configured to execute the "Virtual Router Redundancy Protocol" (VRRP), in particular in accordance with Request for Comments (RFC) 5798.

Both redundant routers 2, 3 are provided with a common virtual IP address and, in the present case, also a common virtual MAC address (with respect to virtual IP and media access control (MAC) addresses, see in particular RFC 5798). The virtual IP and MAC addresses are activated only on the respectively active router 2, 3, in the present case, i.e., the left-hand router 2. If the active router 2 fails, then the other router 3 is switched from the standby mode to the active mode and reclaims the virtual IP and MAC addresses for itself.

The router redundancy modules 10 of the two routers 2, 3 can communicate with one another, this being indicated in FIG. 1 by an arrow 11 connecting the two modules. As such, it is possible for the router 3 that is in the standby mode to be able to be informed if the active router 3 fails and it needs to take over for the active router 3 that has failed.

Specifically, the router redundancy module 10 of the currently active router 3 cyclically transmits, at suitable intervals of time of, for example 1 second, a message to the router redundancy module 10 of the router 2 that is in the standby mode (with respect to cyclic transmission, see in particular "Adver_Timer" in accordance with RFC 5798). If the active router 3 fails, then this message is absent and the router 3 that has hitherto been in the standby mode is transferred to the active state by its router redundancy module 10 in reaction to the absence of the message.

It should be noted that, for the purposes of the presently described exemplary embodiment, the system 1 in accordance with the invention comprises two redundant routers 2, 3. Naturally, there can also be provision for three or more redundant routers 2, 3, and in this case all of the router redundancy modules 10 can likewise communicate with one another. If three or more redundant routers 2, 3 are present, then the failure of an active router 2 results in a decision being made as to which of the two or more remaining routers 2, 3 is transferred to the active mode. Here, there can be provision for an order of priority, for example. It should be additionally, noted that, as an alternative to a message from the respectively active router 2 being absent when the router fails, it is also possible for a message from the router redundancy module 10 thereof to be transmitted only then in order to inform the remaining redundant router(s) 3 about the failure.

The two redundant routers 2, 3 in the present case are autoconfiguring IPv6 routers, the standardized functional "foundation" of which is "prefix delegation" in accordance with RFC 3633. As an alternative to the two routers 2, 3 (or else only one of them) being IPv6 routers, they can also be provided by autoconfiguring NAT64 routers, for example.

Technically, prefix delegation, which can be performed by the DHCPv6 client 7 of the redundant routers 2, 3, is based on DHCPv6 in accordance with RFC 3315 and in particular on the "stateful" variant of DHCPv6. As a result, a state is introduced into the routers 2, 3, which would be stateless without an autoconfiguration that resorts to prefix delegation.

The state is depicted purely schematically in FIG. 1 by an element in the DHCPv6 client 7 of the respective redundant router 2, 3 that is provided with the reference sign 12. Here, the state 12 comprises a prefix, not depicted in more detail in FIG. 1, which is, or was, delegated to the DHCPv6 client 7 of the active redundant router 2 by performing prefix delegation in accordance with RFC 3633, and a virtual DHCPv6 client DHCP unique identifier (DUID). This client DUID identifies the logical, active router 2 to the higher-level plane that delegates the prefix, in particular to a prefix-delegating higher-level router, which is not depicted in FIG. 1.

In order to be also able to provide a continuous service in the "stateful" case, each of the two redundant routers 2, 3 comprises a router control module 13. This is notified of the current router mode by the router redundancy module 10 of the respective router 2, 3, i.e., whether the respective router 2, 3 is in the active mode or in the standby mode. Applicable communications, or messages, are transmitted cyclically, at suitable intervals of time (for example, every second), from the router redundancy module 10 of the respective router 2, 3 to the respective router control module 13 during operation. This is indicated purely schematically in FIG. 1 by arrows 14 that point from the respective router redundancy module 10 to the respective router control module 13. The router redundancy modules 10, or routers 2, 3, are configured accordingly.

The router control modules 13 are further configured to take the role signalled by the router redundancy module 10 as a basis for performing a state synchronization. Specifically, they are configured so as, in the event of the router redundancy module 10 of the respective router 2, 3 signalling to them that the respective router 2, 3 is in the active mode, to synchronize the virtual DUID of the DHCPv6 client 7 of the relevant router 2, 3 and a prefix dynamically delegated to the DHCPv6 client 7 of the relevant router 2, 3 to the other router (possibly routers) 2, 3 that are in the standby mode. If there are three or more redundant routers 2, 3, then a synchronization is performed for all routers that are in the standby mode. The state 12, which comprises the delegated prefix and the virtual DUID of the DHCPv6 client 7, can be stored in the active router 2 in a file in the file system of the router 2, for example.

The synchronization of the state 12 is likewise effected cyclically (for example, every second or at other intervals of time) and by protocol. The synchronization is indicated purely schematically in FIG. 1 by a double-headed arrow 15 that connects the two router control modules 13 of the two redundant routers 2, 3 and double-headed arrows 15 that connect the respective router control module 13 to the state 12.

Only the active router 2 performs prefix delegation in the present case, and only the active router 2 synchronizes a prefix delegated to it and the virtual DUID of its DHCPv6 client 7 to the other router 3, which is in the standby mode. If the router control module 13 of a router 2, 3 receives signalling indicating that the relevant router 2, 3 is in the standby mode (in the present case the router 3), on the other hand, then it does not synchronize a state 12 to the remaining router(s) 2, 3, but rather only receives the state 12 from the precisely one active router 2.

In the present case, the router advertisement module 9 is responsible for announcing the prefix dynamically allocated to the DHCPv6 client 7 of the active router 2 to IPv6 subscribers, not depicted in FIG. 1, connected to the lower-level network 5 in accordance with RFC 4861 ("neighbor discovery"). This relationship is depicted in FIG. 1 by an arrow 16 pointing from the DHCPv6 client 7 to the router advertisement module 9.

Owing to the state synchronization, the respective state 12 of the active redundant router 2 is also available on all of the redundant routers 2, 3 in addition to the same virtual MAC and IP addresses (in particular, in accordance with CARP and/or VRRP in accordance with RFC 5798).

Besides state synchronization, the router control modules 13 also undertake correct orchestration of the DHCPv6 clients 7 and router advertisement modules 9 involved. Specifically, the router control module 13 of a router 2, 3, if it receives signalling from the router redundancy module 10 thereof indicating that the router 2, 3 is in the active state, activates the DHCPv6 client 7 and the router advertisement module 9 and keeps them active for as long as the active mode lasts.

If, on the other hand, the router control module 13 of a router 2, 3 is sent a report by the router redundancy module 10 that the router 2, 3 is in the standby mode, then the router control module 13 deactivates the DHCPv6 client 7 and the router advertisement module 9 of the relevant router 2, 3 and keeps them deactivated for as long as the standby mode lasts. The fact that the router control module 13 influences the DHCPv6 client 7 and the router advertisement module 9 accordingly is indicated purely schematically in FIG. 1 by arrows 17 and 18 that point from the router control module 13 to the DHCPv6 client 7 and the router advertisement module 9, respectively.

If a mode change occurs because one of the routers 2, 3 fails (in the present case the active router 2), then the router control module 13 of that router 2, 3 that is activated in reaction to the failure (in the present case, the second redundant router 3) will start the DHCPv6 client 7 of this router 3, and the latter will (owing to the state synchronization) "entirely normally" resort to the synchronized state 12 during startup. The starting is system-dependent, and in the case of a Linux system can be effected using "systemd", for example, by executing the command "systemctl start dhcpd.service". The router control module 13 of the relevant router 3 is informed about the mode change by the router redundancy module 10 of the router. Upon request, the router 3 activated in reaction to the failure of the router 2 can additionally validate the delegated prefix on the higher-level delegating router, which is not shown in FIG. 1.

In parallel therewith, the router advertisement module 9 of the then activated router 2, which module (just like the DHCPv6 client 7) was activated by the router control module 13 in reaction to the failure of the other redundant router 2, will continue to keep the previous prefix obtained via the synchronization active on the lower-level subnetwork 5.

This change is unable to be seen by IPv6 nodes (not shown) connected to the lower-level subnetwork 5, apart from any temporarily occurring packet loss from this network 5 or into this network 5. In particular, the IPv6 and MAC addresses of the router 2, 3 remain constant. At the same time, the identity of the IPv6 router 2, 3 remains the same from the point of view of the higher-level, delegating router (not shown) too. In the case of IPv6, the identity of clients is coupled solely to the DUID thereof and not to the MAC address thereof.

A redundancy function can be provided and, in this way, a router service can be continuously maintained, even if one of the routers 2, 3 fails, specifically in the case of autoconfiguring, and hence "stateful", routers 2, 3. Automation users obtain the added value of the redundancy of important infrastructure components, in particular their network nodes, without this requiring them to acquire specific IT know-how or to involve IT personnel. State synchronization and role change proceed completely automatically.

Although the invention has been illustrated and described more thoroughly in detail by means of the preferred exemplary embodiment, the invention is not restricted by the disclosed examples, and other variants can be derived there-from by a person skilled in the art without departing from the scope of protection of the invention.

Figure 2:
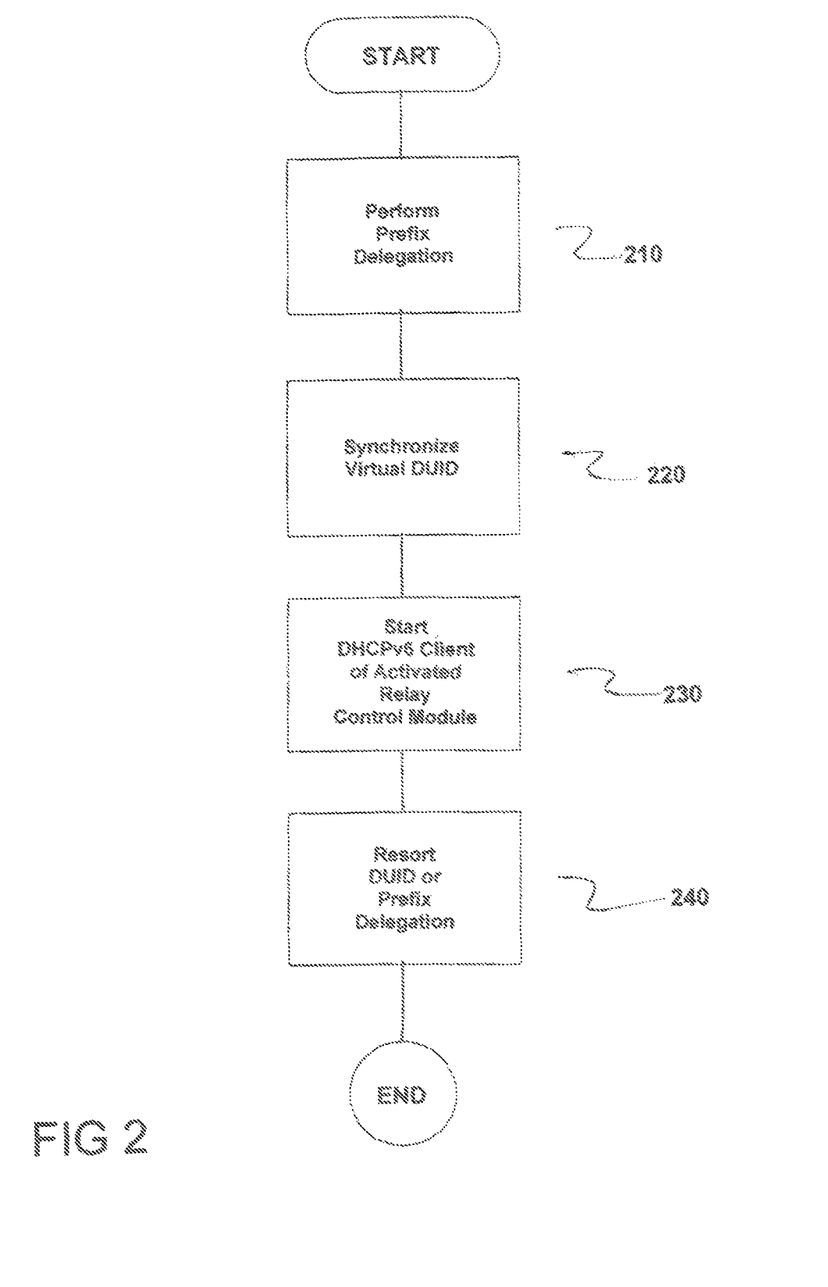
FIG. 2 is a flowchart of the method in accordance with the invention.

FIG. 2 is a flowchart of the method for providing redundant relay functions in a network in which a higher-level subnetwork 4 is connected to a lower-level subnetwork 5 via at least a plurality of redundant relays, where a maximum of one redundant relay of the plurality of redundant relays is operated in an active mode, while the remaining relay of the plurality of redundant relays 2, 3 is operated in a standby mode, each redundant relay of the plurality of redundant relays 2, 3 includes a relay redundancy module 10 for controlling the relay mode, and where the least one remaining relay or precisely one remaining redundant relay of the plurality of redundant relays 2, 3 is activated if the currently active relay of the plurality of redundant relays 2, 3 fails.

The method comprises performing by only a DHCPv6 client 7 of a currently active relay a prefix delegation, as indicated in step 210. In accordance with the invention, each of the plurality of redundant relays 2, 3 includes a DHCPv6 client 7 for performing the prefix delegation and the plurality of redundant relays 2, 3 each include a relay control module 13 to which the relay redundancy module 10 of a respective relay 2, 3 signals the current relay mode.

Next, the relay control module 13 of the respectively active relay 2, 3 synchronizes a virtual DUID of either a respective DHCPv6 client 7 and/or a prefix delegated to the active relay 2, 3 to the or each relay 2, 3 that is in the standby mode, as indicated in step 220.

Next, a relay control module 13 of a relay 2, 3 activated in reaction to a failure starts the respective DHCPv6 client 7 thereof if the currently active relay 2, 3, as indicated in step 230.

Next, the DHCPv6 client 7 resort to either the DHCP unique identifier (DUID) obtained via the synchronization and/or the prefix obtained via the synchronization, as indicated in step 240.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing redundant relay functions in a network in which a higher-level subnetwork is connected to a lower-level subnetwork via at least a plurality of redundant relays, a maximum of one redundant relay of the plurality of redundant relays being operated in an active mode, while at least one remaining relay of the plurality of redundant relays being operated in a standby mode, each redundant relay of the plurality of redundant relays having a relay redundancy controller for controlling the relay mode, and the least one remaining relay or precisely one remaining redundant relay of the plurality of redundant relays being activated if a currently active relay of the plurality of redundant relays fails, the method comprising:

performing, by only a DHCPv6 client of a currently active relay, a prefix delegation, each of the plurality of redundant relays including a DHCPv6 client for performing the prefix delegation and the plurality of redundant relays each including a relay controller to which the relay redundancy controller of a respective relay signals the current relay mode;

synchronizing, by the relay controller of the respectively active relay, a virtual DHCP unique identifier (DUID) of at least one of (i) a respective DHCPv6 client and (ii) a prefix delegated to the active relay to the or each relay which is in the standby mode;

starting, by a relay controller of a relay activated in reaction to a failure, the respective DHCPv6 client thereof based on failure of the relay redundancy controller of the currently active relay to receive messages cyclically transmitted from the relay redundancy controller of the at least one remaining relay of the plurality of redundant relays being operated in the standby mode; and resorting, by the DHCPv6 client, to at least one of (i) the DUID obtained via the synchronization and (ii) the prefix obtained via the synchronization.

2. The method as claimed in claim 1, wherein the relay redundancy controller of each redundant relay is configured to execute a at least one of (ii) Common Address Redundancy Protocol and (ii) Virtual Router Redundancy Protocol, in accordance with RFC 5798.

3. The method as claimed in claim 1, wherein the relay activated in reaction to the failure validates the delegated prefix obtained via the synchronization on a higher-level router.

4. The method as claimed in claim 2, wherein the relay activated in reaction to the failure validates the delegated prefix obtained via the synchronization on a higher-level router.

5. The method as claimed in claim 1, wherein the synchronization of the virtual DUID is effected by virtue of the relay controller of the respectively active relay announcing the virtual DUID to the relay controller of the or each relay in the standby mode.

6. The method as claimed in claim 1, wherein the redundant relays each have a router advertiser via which router advertisement messages can be announced in the lower-level network.

7. The method as claimed in claim 1, wherein the synchronization of the DUID is effected by protocol.

8. The method as claimed in claim 1, wherein the relay controller of each redundant relay which is in the standby mode deactivates the DHCPv6 client and the router advertisement module of the respective relay, or keeps the DHCPv6 client deactivated.

9. The method as claimed in claim 1, wherein each redundant relay stores or is utilized to store the same virtual IP address, and the virtual IP address is only ever activated on the redundant relay which is in the active mode.

10. The method as claimed in claim 1, wherein that instance of the plurality of redundant relays which is the very first to be in the active mode generates a unique, dedicated DHCPv6 client DUID for itself.

11. The method as claimed in claim 1, wherein at least one redundant relay of the plurality of redundant relays comprises at least one of (i) an application layer gateway, (ii) an IPv6 router and (iii) an NAT64 router.

12. A computer program comprising program code in instructions which, when executed by a processor of at least one computer, causes the at least one computer to perform the method as claimed in claim 1.

13. A system for providing redundant relay comprising routing, functions, the system comprising;
a plurality of redundant relays which connect or can connect a higher-level subnetwork to a lower-level subnetwork, wherein each redundant relay of the plurality of redundant relays including a relay redundancy controller;
wherein the system is configured such that a maximum of one redundant relay of the plurality of redundant relays is ever operated in an active mode, while at least one remaining redundant relay of the plurality of redundant relays is in a standby mode, and if a currently active relay fails then the redundant relay or precisely one redundant relay of the at least one remaining redundant relay of the plurality of redundant relays is activated;
wherein each redundant relay of the plurality of redundant relays comprises a DHCPv6 client for performing a prefix delegation and a relay controller; and
wherein the system is further configured such that only a DHCPv6 client of a currently active relay ever performs the prefix delegation, and such that the relay redundancy controller of the respective relay signals the current relay mode to the relay controller of the respective relay, and the relay controller of the respectively active relay synchronizes at least one of (i) a virtual DUID of its DHCPv6 client and (ii) a prefix delegated to the active redundant relay to the or each redundant relay which is in a standby mode and, based on failure of the relay redundancy controller of the currently active relay fails to receive messages cyclically transmitted from the relay redundancy controller of the at least one remaining relay of the plurality of redundant relays being operated in the standby mode, the relay controller of the redundant relay activated in reaction to the failure starts the DHCPv6 client thereof, and the DHCPv6 client resorts to at least one of (i) the DHCP unique identifier (DUID) obtained via the synchronization and (ii) the prefix obtained via the synchronization.

14. The system as claimed in claim 13, wherein the relay redundancy controller of each redundant relay is configured to execute at least one of (i) Common Address Redundancy Protocol and (ii) Virtual Router Redundancy Protocol.

15. The system as claimed in claim 13, wherein the system is further configured such that the relay activated in reaction to the failure validates the delegated prefix obtained via the synchronization on a higher-level router.

16. The system as claimed in claim 14, wherein the system is further configured such that the relay activated in reaction to the failure validates the delegated prefix obtained via the synchronization on a higher-level router.

17. The system as claimed in claim 13, wherein the system is further configured such that the synchronization of the virtual DUID is effected by virtue of the relay control module of the respectively active relay announcing the virtual DUID to the relay control module of the or each relay in the standby mode.

18. The system as claimed in claim 13, wherein the redundant relays each have a router advertiser via which router advertisement messages can be announced in the lower-level network; and wherein the system is further configured such that the router advertiser of the relay activated in reaction to the failure keeps the prefix obtained via the synchronization active in the lower-level network.

19. The system as claimed in claim 13, wherein the system is further configured such that the synchronization of the DUID is effected by protocol.

20. The system as claimed in claim 13, wherein the system is further configured such that the relay redundancy controller of each redundant relay which is in the standby mode deactivates the DHCPv6 client and the router advertiser of the respective relay, or keeps the DHCPv6 client deactivated.

21. The system as claimed in claim 13, wherein the system is further configured such that each redundant relay stores or is used to store the same virtual IP address, and the virtual IP address is only ever activated on the redundant relay that is in the active mode.

22. The system as claimed in claim 13, wherein the system is further configured such that that instance of the redundant relays which is the very first to be in the active mode generates a unique DHCPv6 client DUID for itself.

23. The system as claimed in claim 13, wherein at least one redundant relay of the plurality of redundant relays comprises at least one of (i) an application layer gateway, (ii) an IPv6 router and (iii) an NAT64 router.

24. A non-transitory computer-readable medium comprising computer program instructions which, when executed by a processor on at least one computer, causes the at least one computer to provide redundant relay functions in a network in which a higher-level subnetwork is connected to a lower-level subnetwork via at least a plurality of redundant relays, a maximum of one redundant relay of the plurality of redundant relays being operated in an active mode, while at least one remaining relay of the plurality of redundant relays being operated in a standby mode, each redundant relay of the plurality of redundant relays having a relay redundancy controller for controlling the relay mode, and the least one remaining relay or precisely one remaining redundant relay of the plurality of redundant relays being activated if a currently active relay of the plurality of redundant relays fails, the computer program instructions comprising:
program code for performing, by only a DHCPv6 client of a currently active relay, a prefix delegation, each of the plurality of redundant relays including a DHCPv6 client for performing the prefix delegation and the plurality of redundant relays each including a relay controller to which the relay redundancy controller of a respective relay signals the current relay mode;
program code for synchronizing, by the relay control module of the respectively active relay, a virtual DHCP unique identifier (DUID) of at least one of (i) a respective DHCPv6 client and (ii) a prefix delegated to the active relay to the or each relay which is in the standby mode;
program code for starting, by a relay controller of a relay activated in reaction to a failure, the respective DHCPv6 client thereof based on failure of the relay redundancy module of the currently active relay to receive messages cyclically transmitted from the relay redundancy module of the at least one remaining relay of the plurality of redundant relays being operated in the standby mode; and
program code for resorting, by the DHCPv6 client, to at least one of (i) the DUID obtained via the synchronization and (ii) the prefix obtained via the synchronization.

* * * * *